(12) United States Patent
Estes et al.

(10) Patent No.: US 11,100,052 B2
(45) Date of Patent: Aug. 24, 2021

(54) SYSTEM FOR CLASSIFICATION BASED ON USER ACTIONS

(71) Applicant: Microsoft Technology Licensing, LLC, Redmond, WA (US)

(72) Inventors: Paul Fraedrich Estes, Bellevue, WA (US); Raymond R. Ringhiser, Maple Valley, WA (US); Keith Douglas Senzel, Seattle, WA (US); Jered D Aasheim, Eugene, OR (US); David B Appel, Seattle, WA (US); Peter E. Loforte, Issaquah, WA (US); Pranish Atul Kumar, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 46 days.

(21) Appl. No.: 16/013,530

(22) Filed: Jun. 20, 2018

(65) Prior Publication Data

US 2019/0392049 A1 Dec. 26, 2019

(51) Int. Cl.
*G06F 17/00* (2019.01)
*G06F 16/176* (2019.01)
(Continued)

(52) U.S. Cl.
CPC ........ *G06F 16/176* (2019.01); *G06F 16/2379* (2019.01); *G06F 16/93* (2019.01); *G06F 21/6209* (2013.01); *G06N 20/00* (2019.01)

(58) Field of Classification Search
CPC ........ G06F 16/13; G06F 16/24; G06F 16/156; G06F 16/283
See application file for complete search history.

(56) References Cited

U.S. PATENT DOCUMENTS 5,774,118 A * 6/1998 Hatakama ............... G06F 9/453
  715/707
6,606,613 B1   8/2003 Altschuler et al.
(Continued)

FOREIGN PATENT DOCUMENTS

CN   107464043 A   12/2017
WO   01027847 A1   4/2001
(Continued)

OTHER PUBLICATIONS

"Web 2.0—Wikipedia", Retrieved from https://en.wikipedia.org/wiki/Web_2.0, Retrieved on Jan. 25, 2018, 16 Pages.
(Continued)

*Primary Examiner* — Hung D Le
(74) *Attorney, Agent, or Firm* — Shook, Hardy & Bacon L.L.P.

(57) ABSTRACT

A method may include accessing user activity data with respect to performances of a feature within an electronic application by a user; calculating a similarity score for the user with respect to a level of proficiency for the feature based on the accessed user activity data; and based on the similarity score meeting a threshold value: updating a level of proficiency value in a user profile for the feature of the electronic application; and enabling the user to enter into a collaborative editing mode with another user to complete a document using the feature of the application.

20 Claims, 10 Drawing Sheets

(51) Int. Cl.
  *G06F 16/23* (2019.01)
  *G06F 16/93* (2019.01)
  *G06N 20/00* (2019.01)
  *G06F 21/62* (2013.01)

(56) References Cited

U.S. PATENT DOCUMENTS

| | | | |
|---|---|---|---|
| 6,691,159 | B1 | 2/2004 | Grewal et al. |
| 7,177,316 | B1 | 2/2007 | Pilecek |
| 7,672,543 | B2 | 3/2010 | Hull et al. |
| 7,680,901 | B2 | 3/2010 | Rechterman et al. |
| 7,730,030 | B1 | 6/2010 | Xu |
| 7,865,457 | B2 | 1/2011 | Ravin et al. |
| 7,933,815 | B2 | 4/2011 | Hutty et al. |
| 8,151,192 | B2* | 4/2012 | Black .................. G06F 9/453 715/708 |
| 8,280,882 | B2 | 10/2012 | Troy et al. |
| 8,473,423 | B2 | 6/2013 | Krishnakumar et al. |
| 8,639,552 | B1 | 1/2014 | Chen et al. |
| 8,666,961 | B1 | 3/2014 | Qureshi et al. |
| 8,676,806 | B2 | 3/2014 | Simard et al. |
| 9,002,700 | B2 | 4/2015 | Hoover et al. |
| 9,020,887 | B2 | 4/2015 | Ngo et al. |
| 9,077,804 | B2 | 7/2015 | Kannan et al. |
| 9,230,031 | B2 | 1/2016 | Ickman et al. |
| 9,430,299 | B2 | 8/2016 | Naveh et al. |
| 9,635,181 | B1 | 4/2017 | McGann et al. |
| 9,686,086 | B1 | 6/2017 | Nguyen et al. |
| 9,716,745 | B2 | 7/2017 | Santero et al. |
| 9,767,486 | B2 | 9/2017 | Mihalik et al. |
| 10,380,516 | B1 | 8/2019 | Kislaki et al. |
| 10,439,836 | B2 | 10/2019 | Rosenberg et al. |
| 2003/0182450 | A1 | 9/2003 | Ong et al. |
| 2005/0256695 | A1 | 11/2005 | Oh |
| 2005/0268234 | A1* | 12/2005 | Rossi, Jr. .............. G06F 9/453 715/705 |
| 2006/0047615 | A1* | 3/2006 | Ravin .................. G06N 5/022 706/50 |
| 2006/0059151 | A1 | 3/2006 | Martinez et al. |
| 2007/0050360 | A1 | 3/2007 | Hull et al. |
| 2007/0179958 | A1 | 8/2007 | Chen et al. |
| 2008/0215976 | A1 | 9/2008 | Biemer et al. |
| 2008/0320081 | A1 | 12/2008 | Shriver-Blake et al. |
| 2009/0182885 | A1 | 7/2009 | Sang et al. |
| 2009/0183072 | A1* | 7/2009 | Stephenson .......... G06F 9/453 715/708 |
| 2009/0199097 | A1* | 8/2009 | Black .................. G06F 9/453 715/708 |
| 2009/0287682 | A1 | 11/2009 | Fujioka et al. |
| 2010/0004944 | A1 | 1/2010 | Palaniappan |
| 2010/0146483 | A1 | 6/2010 | Komarov et al. |
| 2010/0174783 | A1 | 7/2010 | Zarom |
| 2010/0250529 | A1 | 9/2010 | Surendran et al. |
| 2011/0053126 | A1 | 3/2011 | Bielenberg et al. |
| 2011/0307408 | A1 | 12/2011 | Gates |
| 2012/0076283 | A1 | 3/2012 | Ajmera et al. |
| 2012/0109883 | A1 | 5/2012 | Iordanov et al. |
| 2012/0117070 | A1 | 5/2012 | Hiltz-Laforge et al. |
| 2013/0124649 | A1 | 5/2013 | Triantos et al. |
| 2013/0253969 | A1 | 9/2013 | Das et al. |
| 2014/0025441 | A1 | 1/2014 | Eberlein et al. |
| 2014/0067964 | A1 | 3/2014 | Grishaver et al. |
| 2014/0074272 | A1 | 3/2014 | Cowden, IV |
| 2014/0082072 | A1 | 3/2014 | Kass et al. |
| 2014/0108183 | A1 | 4/2014 | Davis |
| 2014/0137074 | A1* | 5/2014 | Hey .............. G06Q 10/063112 717/101 |
| 2014/0237037 | A1 | 8/2014 | Waingold |
| 2014/0270108 | A1 | 9/2014 | Riahi et al. |
| 2014/0289702 | A1 | 9/2014 | Mcmahon et al. |
| 2015/0200893 | A1 | 7/2015 | Harris et al. |
| 2015/0206063 | A1* | 7/2015 | Santero ............... G06Q 30/016 706/12 |
| 2015/0288748 | A1 | 10/2015 | Oh |
| 2015/0310446 | A1 | 10/2015 | Tuchman et al. |
| 2015/0363405 | A1 | 12/2015 | Biswas et al. |
| 2016/0117941 | A1 | 4/2016 | Mitchell et al. |
| 2016/0253426 | A1 | 9/2016 | Snapir et al. |
| 2016/0267188 | A1 | 9/2016 | Spaulding et al. |
| 2016/0380933 | A1 | 12/2016 | Topaltzas et al. |
| 2017/0011308 | A1 | 1/2017 | Sun et al. |
| 2017/0178078 | A1 | 6/2017 | Fernando |
| 2017/0185589 | A1 | 6/2017 | Neff et al. |
| 2017/0205965 | A1 | 7/2017 | Goel et al. |
| 2017/0223190 | A1* | 8/2017 | Mandel .................. G06N 5/04 |
| 2017/0270079 | A1 | 9/2017 | Rajwat et al. |
| 2017/0288879 | A1 | 10/2017 | Quinlan et al. |
| 2017/0308610 | A1 | 10/2017 | Mullins et al. |
| 2018/0067903 | A1 | 3/2018 | Maker et al. |
| 2018/0068274 | A1 | 3/2018 | Buffington |
| 2018/0089156 | A1 | 3/2018 | Kapoor et al. |
| 2018/0096437 | A1 | 4/2018 | Sun et al. |
| 2018/0150571 | A1 | 5/2018 | Douglas et al. |
| 2018/0197428 | A1* | 7/2018 | Baphna .................. G09B 7/00 |
| 2018/0322644 | A1* | 11/2018 | Sunkavalli ............... G06T 7/40 |
| 2019/0121827 | A1 | 4/2019 | Boswell et al. |
| 2019/0129973 | A1 | 5/2019 | Truong et al. |
| 2019/0291010 | A1* | 9/2019 | Benedetto .............. A63F 13/87 |
| 2019/0384686 | A1 | 12/2019 | Estes et al. |
| 2019/0384832 | A1 | 12/2019 | Estes et al. |
| 2019/0384833 | A1 | 12/2019 | Estes et al. |
| 2019/0394203 | A1 | 12/2019 | Estes et al. |
| 2019/0394257 | A1 | 12/2019 | Estes et al. |

FOREIGN PATENT DOCUMENTS

| | | |
|---|---|---|
| WO | 2009076555 A2 | 6/2009 |
| WO | 2014012138 A1 | 1/2014 |
| WO | 2017210032 A1 | 12/2017 |

OTHER PUBLICATIONS

Adler, et al., "A Content-Driven Reputation System for the Wikipedia", In Proceedings of the 16th International Conference on World Wide Web Conference, May 8, 2007, 10 Pages.

Coyle, James E., Jr., "Wikis in the College Classroom: A Comparative Study of Online and Face-to-Face Group Collaboration at a Private Liberal Arts University", In Thesis Submitted to the Education, Health, and Human Services in Partial Fulfillment of the Requirements for the Degree of Doctor of Philosophy, May 2007, 273 Pages.

Koch, Michael, "Community Support in Universities—The Drehscheibe Project", In Proceedings of 1st International Conference on Communities and Technologies, Jan. 2003, 19 Pages.

Zheng, et al., "A Deep Learning Approach for Expert Identification in Question Answering Communities", In Journal of Computing Research Repository, Nov. 14, 2017, 7 Pages.

"Non-Final Office Action Issued in U.S. Appl. No. 16/013,534", dated Oct. 21, 2019, 9 Pages.

Lee, et al., "Increasing the Responsiveness of Recommended Expert", In Proceedings of the 23rd ACM International Conference on Conference on Information and Knowledge Management, Nov. 3, 2014, pp. 749-758.

"International Search Report and Written Opinion Issued in PCT Application No. PCT/US2019/035897", dated Sep. 19, 2019, 12 Pages.

"International Search Report and Written Opinion Issued in PCT Application No. PCT/US2019/035915", dated Sep. 18, 2019, 13 Pages.

"International Search Report and Written Opinion Issued in PCT Application No. PCT/US2019/036204", dated Sep. 30, 2019, 11 Pages.

"Peerwith Expert Interface and Payment", Retrieved from: https://www.youtube.com/watch?v=m0E22Geyhgl, Apr. 23, 2018, 01 Pages.

"International Search Report and Written Opinion Issued in PCT Application No. PCT/US19/035904", dated Sep. 4, 2019, 11 Pages.

"International Search Report and Written Opinion Issued in PCT Application No. PCT/US19/036205", dated Sep. 10, 2019, 12 Pages.

(56) References Cited

OTHER PUBLICATIONS

"International Search Report and Written Opinion Issued in PCT Application No. PCT/US19/036642", dated Aug. 21, 2019, 12 Pages.
"Notice of Allowance Issued in U.S. Appl. No. 16/013,554", dated Oct. 27, 2020, 15 Pages.
"Non-Final Office Action Issued in U.S. Appl. No. 16/009,946", dated Sep. 25, 2020, 27 Pages.
"Final Office Action Issued in U.S. Appl. No. 16/009,988", dated Oct. 13, 2020, 20 Pages.
"Non Final Office Action Issued in U.S. Appl. No. 16/009,970", dated Mar. 8, 2021, 22 Pages.
"Non Final Office Action Issued in U.S. Appl. No. 16/009,988", dated Apr. 2, 2020, 17 Pages.
"Notice of Allowance issued in U.S. Appl. No. 16/013,534", dated Apr. 16, 2020, 18 Pages.
"Non Final Office Action Issued in U.S. Appl. No. 16/013,554", dated Mar. 19, 2020, 14 Pages.
"Non Final Office Action Issued in U.S. Appl. No. 16/009,970", dated Jun. 26, 2020, 18 Pages.
"Final Office Action Issued in U.S. Appl. No. 16/009,970", dated Nov. 16, 2020, 20 Pages.
"Final Office Action Issued in U.S. Appl. No. 16/009,946", dated May 7, 2021, 30 Pages.

* cited by examiner

FIG. 2

| ORDER ID | ORDER DATE | PHONE NUMBER | CUSTOMER NAME | STATE |
|---|---|---|---|---|
| 1 | 3/12/16 | 612-555-3234 | KIMBERLY J. LOPEZ | MN |
| 2 | 3/24/16 | 612-555-3455 | FRANCIS M. GRAY | MN |
| 3 | 3/31/16 | 612-555-2345 | JENNY SMITH | MN |
| 4 | 6/14/16 | 202-555-3455 | KATHERINE S. STANBACK | DC |
| 5 | 6/17/16 | 763-555-1269 | JENNY SMITH | MN |
| 6 | 8/2/16 | 408-555-8734 | MATT CARARILLO | CA |
| 7 | 9/1/16 | 410-555-2345 | LINCOLN WHITE | MD |
| 8 | 10/17/16 | 501-376-6023 | LEE G. WILLIAMS | AK |
| 9 | 12/10/16 | 612-555-2345 | JENNY SMITH | MN |
| 10 | 1/12/17 | 612-555-2745 | FRANCIS M. GRAY | MN |
| 11 | 3/12/17 | 612-555-8964 | MICHAEL P. HUFNAGEL | MN |
| 12 | 6/12/17 | 612-555-2345 | JENNY SMITH | MN |
| 13 | 7/25/17 | 337-555-1385 | JAMES MONTES | LA |
| 14 | 8/19/18 | 612-555-2345 | JENNY SMITH | MN |

HELP 206

CREATE A REPORT

CONNECT WITH AN EXPERT WHO CAN HELP
CONNECT

SEARCH RESULTS
CREATE A DATA MODEL
CALENDAR TEMPLATES
CREATE A PIVOT TABLE
CREATE A CHART 202, 204, 208, 210

| ORDER ID | ORDER DATE | PHONE NUMBER | CUSTOMER NAME | STATE | REQUEST DETAILS |
|---|---|---|---|---|---|
| 1 | 3/12/16 | 612-555-3234 | KIMBERLY J. LOPEZ | MN | WHAT IS YOUR REQUESTED DUE DATE? |
| 2 | 3/24/16 | 612-555-3455 | FRANCIS M. GRAY | MN | |
| 3 | 3/31/16 | 612-555-2345 | JENNY SMITH | MN | |
| 4 | 6/14/16 | 202-555-3455 | KATHERINE S. STANBACK | DC | PLEASE ENTER AN AMOUNT YOU ARE WILLING TO SPEND |
| 5 | 6/17/16 | 763-555-1269 | JENNY SMITH | MN | |
| 6 | 8/2/16 | 408-555-8734 | MATT CARARILLO | CA | |
| 7 | 9/1/16 | 410-555-2345 | LINCOLN WHITE | MD | WHO IS YOUR INTENDED AUDIENCE? |
| 8 | 10/17/16 | 501-376-6023 | LEE G. WILLIAMS | AK | |
| 9 | 12/10/16 | 612-555-2345 | JENNY SMITH | MN | |
| 10 | 1/12/17 | 612-555-2745 | FRANCIS M. GRAY | MN | |
| 11 | 3/12/17 | 612-555-8964 | MICHAEL P. HUFNAGEL | MN | |
| 12 | 6/12/17 | 612-555-2345 | JENNY SMITH | MN | |
| 13 | 7/25/17 | 337-555-1385 | JAMES MONTES | LA | |
| 14 | 8/19/18 | 612-555-2345 | JENNY SMITH | MN | |

FIG. 3

SYSTEM FOR CLASSIFICATION BASED ON USER ACTIONS

BACKGROUND

Modern software often allows multiple users to edit a single document. A local copy of the document may exist on respective computing devices of the multiple users, but permissions and version control may be managed by an online service (e.g., a cloud-based document management service). For example, a first user may grant permission to a second user to edit a document the first user created. The network service may also provide online editing of the document. Online edits may be promulgated back down to local copies.

Most software also includes search functionality for helping users create documents associated with the software. For example, a spreadsheet application may include help entries for built-in function call for use in cells and help entries on chart creation. The help entries are stored within the application or stored in an online location, in various examples.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 2 illustrates a user interface for requesting assistance with document completion, according to various examples.

FIG. 3 illustrates a user interface for presenting document characteristic questions, according to various examples.

DETAILED DESCRIPTION

Figure 1:
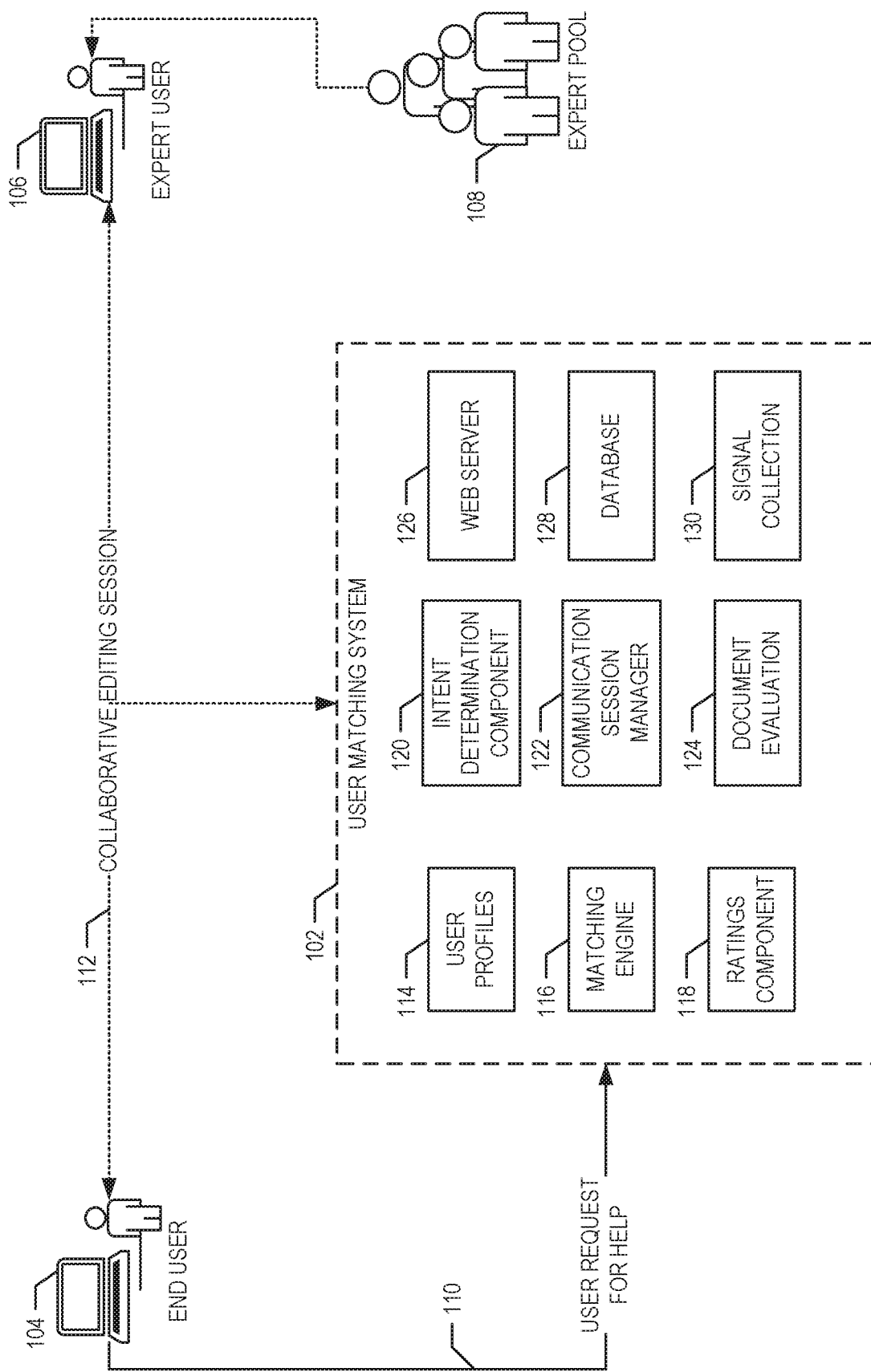
FIG. 1 is schematic diagram illustrating a collaborative editing session established by a user matching system, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device accessible by the component via an API or other program communication method. Similarly, the variables may be assumed to have a default values should a specific value not be described. Described systems and methods may provide a user interface for an end-user or administrator to edit the variable values in some instances.

Modern computer programs (applications) often include functionality in the form of features that an end user does not know exist. This is a separate problem from knowing a feature exists, but the user not knowing how to use it. In the latter scenario, an online or in-application help section may explain how to use the features; however, if users do not know the feature exists, they cannot ask for help.

For example, a user may have an end goal-such as, performing an analysis of product sales. The user may have a spreadsheet document containing the data, but have no idea how to, via an application, generate a document with the necessary analysis. One solution may be for the user to go online and request help using a request for proposal (RFP) style bidding process. Then, the user may transmit the spreadsheet to an expert user who won the bid and the spreadsheet document may be completed by the expert user.

The RFP solution has a number of challenges. First, the user requesting help has to leave the application to request help, which creates inefficiencies to complete the task. Second, the user may have no way to verify that the expert user is actually an expert. Third, data privacy may be compromised by transmitting the data to the expert user outside of a secured environment.

In order to overcome the challenges of the RFP model (and other prior solutions), a number of technical problems may be addressed in the areas of user interface design, encryption, data privacy, data access control, artificial intelligence/machine learning, and user activity monitoring. For example, new user interfaces may be generated, within an application, to allow an end user to request help without requiring computing resources to be used with opening an additional application to request the help. Resources may be further conserved by permitting data access to the expert user within the application itself 13 as opposed to transmitting a document to the expert user via another application. Additional benefits may be realized to one skilled in the art after reading this disclosure Described herein is a user matching system that alleviates the technical challenges described previously. Consider that an end user is working in an application and needs help with creating a document with a set of characteristics. For illustration purposes, the characteristics include a document that describes which products were sold in the highest quantity, broken down by month and region of a sales area, and the application is a spreadsheet application. Furthermore, the end user may not even know if the spreadsheet application can help with creating the document the end user needs, but decides help is needed.

The end user may then, within the application, request help by describing the end goal of a completed document. The user matching system may receive the request and description, and then initiate a matching process to pair the end user with an expert user 13 an expert at least with regards to that specific task 13 to help the end user with the task. In various examples, the request and matching process are not performed in real time. For example, the request may be received and then at a later time (e.g., in an overnight batch), the matching process may be performed. A collaborative document editing and communication session may be established between the end user and expert user. Within the session, the expert user may complete the document on behalf of the end user. In some examples, multiple expert users may be used to complete the document (e.g., each expert user may perform different tasks). More detailed descriptions of each of these operations is described below.

FIG. 1 is schematic diagram illustrating a collaborative editing session established by a user matching system, according to various examples. FIG. 1 illustrates user matching system 102, end user 104, expert user 106, expert pool 108, user request 110, and collaborative editing session 112. User matching system 102, as illustrated, includes user profiles 114, matching engine 116, ratings component 118, intent determination component 120, communication session manager 122, document evaluation 124, web server 126, database 128, and signal collection 130.

For illustration purposes, user matching system 102 is illustrated as set of separate components (e.g., matching engine 116, ratings component 118, etc.). However, the functionality of multiple, individual components may be performed by a single component. A component may represent computer program code that is executable by a processing unit (e.g., a core of a general-purpose computer processor, a graphical processing unit, an application specific integrated circuit, etc.) The program code may be stored on a storage device and loaded into a memory of the processing unit for execution. Portions of the program code may be executed in parallel across multiple processing units. Execution of the code may be performed on a single device or distributed across multiple devices. In some example, the program code is executed on a cloud platform (e.g., MICROSOFT AZURE®- or AMAZON EC2®) using shared computing infrastructure.

In various examples, the assets and components in FIG. 1 may communicate via one or more networks (not illustrated). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. A network may include a single local area network (LAN) or wide-area network (WAN), or combinations of LAN's or WAN's, such as the Internet.

A user (e.g., end user 104 or expert user 106) may interact with a variety of systems/devices and a user have more than one role within each system. For example, a user, Alice, may request help from another user, Bob, within an application to complete a document. Alice may also help out a third user, Charlie, with a document within a different application. Throughout this disclosure, a user may be referred to with a modifier indicating the role the user is currently acting upon. For example, an expert user may be a user that has been paired up with an end user to help perform a task.

Users may have additional roles beyond being an expert user or end user. For example, a user may have a role as a contributor. A contributor user may edit or generate content in a document repository. An administrator user may edit backend scoring formulas, machine learning algorithms, etc.

A user may be represented in user matching system 102 as a user profile data structure stored within user profiles 114. User profiles 114 may be part of another database (e.g., database 128) or exist as a standalone database. The user profile data structure may include additional data structures. For example, the user profile data structure may include a one or more rating data structures that identifies ranking scores for the user's different roles (described in further detail herein with respect to FIG. 5).

The user profile data structure may include a user identification for the user. Each user identification may be unique. The user identification may be comprised of alphanumeric characters. The user identification is an e-mail address, in an example. The user identification may be shared across the roles of the user. Accordingly, a computer program may query user profiles 114 with a single user identification to retrieve data about the user for each role— as opposed to using a different user identification for each role. The user identification may be used across multiple application in an application suite and may be the same identification used as an enterprise login.

The user profile data structure may include entries associated with external sources of information associated with the user. An entry may include credentials (e.g., user id, tokens, etc.) and a logical access location (e.g., website/API URL) for the external source of information. Periodically (e.g., daily), signal collection 130 may retrieve data from the external sources as described further herein below. A user profile data structure may identify user characteristics with respect to a user. Characteristics may include, but are not limited to, demographics (age, etc.), application proficiencies (e.g., novice user of spreadsheet application XYZ) based on rating data structures, feature/task level proficiencies in an application, education level, and current and past jobs.

The user profile data structure may additional include availability information. For example, the information may indicate when (days, times, etc.) the user is available to help with another user. The information may also indicate whether or not the user is currently helping another user, and is therefore not currently available. In such an instance, the user profile may further include data indicating the expected period of time before the user is available again.

The user profile data structure may be established through a combination of manual and automated entry. As indicated above, a user's identification may persist across multiple systems. Thus, multiple systems may access and alter data in the user profile data structure. For example, user matching system 102 may provide a user interface (e.g., web, mobile, in-application, etc.) in which the user may view the data stored in their user profile data structure and edit the structure. In another example, an administrator user may access the user profile to add/edit details to a user's profile data structure.

End user 104 and expert user 106 may use client devices to communicate with user matching system 102, and each other. The client devices may comprise, but are not limited to, a smartphone, tablet, laptop, multi-processor system, microprocessor-based or programmable consumer electronics, game console, set-top box, or any other device that a user utilizes to communicate over a network. In example embodiments, the client devices comprise a display module (not shown) to display information (e.g., in the form of specially configured user interfaces). In some embodiments, the client devices comprise one or more of a touch screen, camera, keyboard, microphone, and Global Positioning System (GPS) device.

Matching engine 116 may be used to process user request 110 to select expert user 106 from expert pool 108. Upon determining a match, communication session manager 122 may be used to establish collaborative editing session 112. To select expert user 106, matching engine 116 may use the functionality of other components of user matching system 102 such as intent determination component 120 to determine the end goal of a document for end user 104; ratings component 118 to obtain ratings (e.g., application and task proficiencies) with respect to the end goal; and document evaluation 124 as a further signal as to user intent. More detailed explanations of these components are provided herein. The end user 104 and expert user 106 may establish collaborative editing session 112 and the attendant communications that support the collaborative editing session 112 directly or through user matching system 102 or a separate server (not shown for clarity).

Data used in user matching system 102 may be organized and stored in a variety of manners. For convenience, the organized collection of data is described herein as database 128. The specific storage layout and model used in database 128 may take a number of forms-indeed, database 128 may utilize multiple models. Database 128 may be, but is not limited to, a relational database (e.g., SQL), non-relational database (NoSQL), a flat file database, object model, document details model, graph database, shared ledger (e.g., blockchain), or a file system hierarchy. Database 128 may store data on one or more storage devices (e.g., a hard disk, random access memory (RAM), etc.). The storage devices may be in standalone arrays, part of one or more servers, and may be located in one or more geographic areas as part of shared computing infrastructure.

Web server 126 may be configured to serve data in the form of webpages or web applications to user matching system 102 and end user 104. Although generally discussed in the context of delivering webpages via the Hypertext Transfer Protocol (HTTP), other network protocols may be utilized by web servers 110 (e.g., File Transfer Protocol, Telnet, Secure Shell, etc.) A user may enter in a uniform resource identifier (URI) into a network browser (e.g., the INTERNET EXPLORER® web browser by Microsoft Corporation or SAFARI® web browser by Apple Inc.) that corresponds to the logical location (e.g., an Internet Protocol address) of one or more pages served by web server 126. In response, web server 126 may transmit a web page that is rendered on a display device user matching system 102 or end user 104.

User matching system 102 may use or define one or more application programming interfaces (API). An API provides a method for computing processes or systems to exchange data. A web-based API, such may be defined by user matching system 102 and accessed via web server 126 may permit users to upload and download documents from user matching system 102.

The API may define a set of HTTP calls according to Representational State Transfer (RESTful) practices. A RESTful API may define various GET, PUT, POST, DELETE methods to create, replace, update, and delete data stored on database 128. For example, "GET/preferences/userid" may be used to retrieve user preferences for the identification indicated by "userid." An API may transmit responses to requests for data according to the JavaScript Object Notation (JSON) format.

Because of the sensitive nature of data stored by and used by user matching system 102, various security measures may be used to protect data at rest and in transmit. For example, APIs may use tokens or API keys to ensure only authorized parties may retrieve or user matching system 102. Additionally, data transmitted over the network may use a cryptographic protocol, such Secure Socket Layer (SSL) or Transport Layer Security (TLS). As a further security precaution, the transmitted data itself may be encrypted, separately from the SSL or TLS encryption. Public-key infrastructure (PKI) may be leveraged for SSL/TLS as well as the separate data encryption.

As an additional privacy precaution, users may be provided an interface (e.g., via web server 126) to see data that has been collected by user matching system 102. The user may have the option of deleting some or all of the data. Furthermore, the user may set a time for expiration of the data. In various examples, users may have to opt-in to data collection before data may be collected by user matching system 102 for use in matching. Periodically, the user may be reminded that user matching system 102 is collecting the data.

FIG. 2 illustrates a user interface 200 for requesting assistance with document completion, according to various examples. FIG. 2 includes content portion 202 of a sample document and assistance portion 204 that includes help query 206, expert request 208, and query results 210.

User interface 200 may be associated with an application opened by end user 104 on the user's computing device. The application may be downloaded and executed locally on the computing device or accessed as a web application served by web server 126. Even while the application is executing locally, the application may communicate with user matching system 102 over a network connection to facilitate matching and collaborative editing of a document.

An application may be represented as a set of computer code stored on one or more storage devices and executed by one or more processing units (e.g., a core of a central processing unit, a graphics processing unit, etc.). In an example, functionality of an application may be integrated into one or more specialized circuits (e.g., application specific integrated circuit). A storage device or computer-readable storage medium is distinct from a signal-bearing medium, such as a transitory signal.

A user may interact with an application using input and output devices of a computing device. For example, the application may be presented on a display device of the computing device and the user may use a keyboard to enter data into the application.

An application may include a number of features (e.g., functionality) available to the user. For example, a word processing application may include a template feature to allow the user to create a resume. A spreadsheet applicant may include a feature to generate a pivot table or calculate net present value. A feature of application may be activated within the application by the user using an input device to select a menu item click a user interface element on a toolbar, etc. Different applications may include common features. For example, multiple spreadsheet applications may include a pivot table feature. Some features may be unique to an application. The output of an application may be a document.

As illustrated, user interface 200 includes two portions: content portion 202 and assistance portion 204. Content portion 202 may be the editable portion of a document. Assistance portion 204 may relate to helping a user use the features of the application to complete the document. Although illustrated as part of a contiguous interface, assistance portion 204 may be displayed in separate windows, as a pull-out window from content portion 202, as a floating window, etc.

When using an application, a user often has an end goal in mind. For example, they may want to create a household budget, plan a wedding, or create a resume. As used herein, the end goal may also be referred to as a document intent. Upon completion of the document, according to a determined document intent, the user's end goal may be realized.

It may not be readily apparent to an application what the document intent is when a document is first created, but may be inferred based upon signals collected by signal collection 130 and document evaluation.

Document intent may be contrasted with feature intent. Feature intent may relate to features of an application that the user wishes to use to fulfill the document intent. For example, the user may want to know more about how to create a header or crop a picture.

With reference to assistance portion 204, an end user may enter in help query 206. In this example, the end user is requesting help with creating a report. The application may query a knowledge database and provide query results 210 based on the query. Query results 210 may relate to features of the application that may assist the end user in creating a report; however, the user may not know what these features are or if they are useful to generating a report that user needs. Accordingly, end user 104 may initiate a request via expert request 208 to work with an expert user to complete end user's 104 document.

FIG. 3 illustrates a user interface for presenting document characteristic questions, according to various examples. FIG. 3 includes content portion 202 and assistance portion 204. FIG. 3 may represent a view of the application in FIG. 2 after a user has initiated a request for help using expert request 208. As illustrated, assistance portion 204 has been updated to present a series of questions 302 related to the request for help. The questions may be used—in conjunction with additional collected signals—to determine the expected characteristics of the completed document for the user. The expected characteristics may include the expected content of the completed document (e.g., a resume) as well as completion preferences.

Completion preferences may be user-specific preferences with respect to an individual document completion request. For example, a due date such as when the end user needs the completed document may vary from request to request. Similarly, the intended audience and amount of money the user is willing to spend may be variable between requests.

In various examples, the completion preferences are set according to user matching system 102 to reduce the amount of questions presented to a user. For example, over a period of time user matching system 102 may store what a market rate is for a given task. Accordingly, the user may not need to potentially over pay for a given task.

Based at least on the expected characteristics of the completed document, a document intent may be determined by intent determination component 120. Database 128 may store a set of document intents as document intent data structures. Example document intents include updating a resume, creating a pitch deck for a start-up, and conducting a quantitative analysis of sales data. Each document intent may have variants. For example, creating a resume for a summer job may involve a different set of skills (and have a different value) than updating a resume of an executive. Document intents may conform to a standardized taxonomy (e.g., ontology) in some instances. Accordingly, document intents may be hierarchical such that the skills needed to perform a parent document flow to the document intent's children.

Document intents may be managed-created, deleted, updated, etc.—using a task management UI. The task management UI may be served as a web interface or standalone application, in various examples. The task management UI may be hosted within or be communicatively coupled to user matching system 102. Access to the task management UI may be managed according to authorized personnel. The task management UI may present a set of input UI elements to define a document intent. In some examples, the UI inputs correspond to fields in a document intent data structure, described further herein with respect to FIG. 4.

Document intents may also be suggested or determined by machine learning models. For examples, over a period of time, an unsupervised machine learning model (k-nearest neighbor, etc.) may ingest data from previously completed unlabeled documents. The data may include a description entered by an end user, output document type, end user telemetry data (e.g., steps taken within an application) leading up to the request, expert user activity in completing the document (e.g., what application functionality was used), etc.

The machine learning model may output clusters of unlabeled document intents. These document intents may be presented in the document management UI as possible new document intents. Then, each cluster may be labeled and/or altered by an authorized user.

Figure 4:
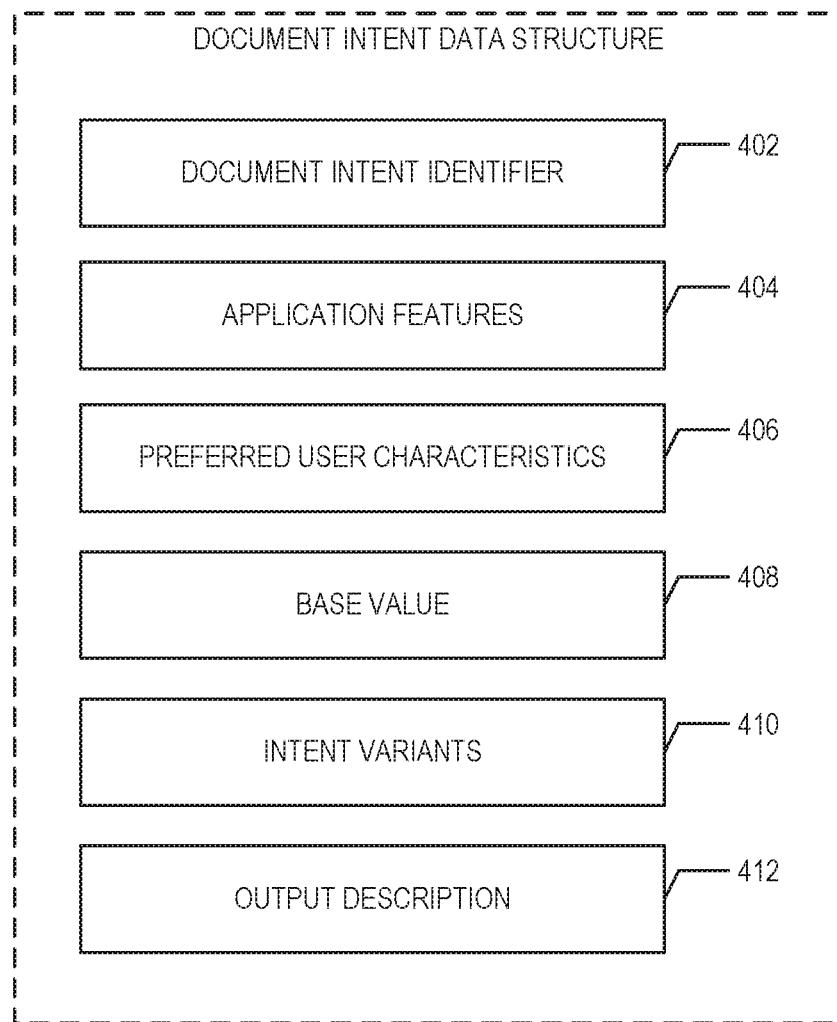
FIG. 4 illustrates a document intent data structure, according to various examples.

FIG. 4 illustrates a document intent data structure, according to various examples. FIG. 4 includes document intent identifier 402, application features 404, preferred user characteristics 406, base value 408, intent variants 410, and output description 412.

The underlying structure of a document intent may conform to a standardized format. For example, an XML Schema Definition (XSD) file may be used to indicate the various illustrated portions of a document intent structure as described above. When a new document intent is created, the document intent may be stored as an XML document conforming to the XSD file. Other file formats may be used without departing from the scope of this disclosure.

Document intent identifier 402 may be used for indexing and searching—for example, in database 128. Document intent identifier 402 may also be what is matched when determining a user's intent using processes described herein. For example, document intent identifier 402 may be "Resume" if the document is a generic resume document or "Executive Resume" if the document is a more specialized resume.

Application features 404 may identify a set of features (e.g., tasks) that may be needed to complete a document. As each document may likely be completed in a number of differing manners, application features 404 may identify a superset of features needed to complete the document. Application features 404 may have an importance rating (e.g., 1-5) signifying whether or not the feature is likely needed to successfully complete the document. Features may be grouped when only one of them is needed to complete the document (e.g., one of features A, B, or C).

Preferred user characteristics 406 may identify the characteristics of a user that may be relevant to complete the document. For example, user characteristics with respect to a user's application proficiencies, education level, availability (e.g., time periods available to work), and current/past job experience may be identified. As with application features 404, user characteristics 406 may have an importance rating.

Base value 408 may be a qualitative or quantitative value that represents the standard value for a document intent. For example, base value 408 may be a "$500", "high value", or '1'. Base value 408 may be used in calculating a personalized value for an end user that requests the document be completed. For example, if the end user needs the document performed in one day, a multiplier of '3' may be applied to base value 408. The resulting personalized value may be used in matching one or more expert users to the end user.

Intent variants 410 may identify data structures (e.g., by document intent identifier) for variants of the document intent. For example, one or more parent document intents and one or more child document intents may be identified. Thus, when the matching process is performed, the application features 404 and preferred user characteristics 406 may be retrieved from any identified parent document intents.

Output description 412 may include text that is presented to an end user or expert user that describes the document intent, and an expected output of the task. This may be used to confirm with the end user that the user matching system 102 correctly identified the document intent requested by the end user. The output description 412 may also include keywords associated with the document intent. The keywords may be the same as those presented to the end user, in some examples, Intent determination component 120 may be configured to match expert request 208 with one or more document intents as stored in database 128. Matching may be performed in a number of different ways and may be configurable by an administrator user. For example, text similarities algorithms such as longest common substring, Damerau-Levenshtein distance, Jaro, Jaro-Winkler, N-gram, cosine similarity, etc. may be used to determine a similarity score between expert request 208 and output description 412—or other text corpus for a document intent—of each document intent stored in database 128.

More complex techniques may be used to make a match that use additional signals beyond text similarity. These signals may include, but are not limited to, the application the request was made in, user characteristics of the end user, end user telemetry data (e.g., steps taken within an application) leading up to the request, a template selected by the user during creation of the document, and the current content of the document. The signals may be collected by signal collection 130.

These signals may be encoded for use in a previously trained machine learning model. The output of the machine learning model may indicate a probability score for each document intent. The higher the probability the more likely the expert request 208 is for that particular document intent. In another example, a weighted formula may be used based on one or more of the identified signals.

In some examples, the highest calculated score (text similarity or other more complex techniques) may be considered the match. In some examples, the document intents with the top (e.g., three highest) scores are presented to the user to confirm which of the document intents the end user actually meant in expert request 208.

Matching engine 116 may determine a set of potential expert users to complete the document once intent determination component 120 has determined a document intent. For example, the application features and preferred user characteristics of the document intent may be compared to ratings of expert users in expert pool 108. The ratings may be stored as part of the expert user's profiles be stored in user profiles 114. Preferred user characteristics of the document intent compared with the characteristics of the expert users may also be as a factor to determine the set of potential expert users. For example, if an expert user does not have the preferred education level, that expert user may not be included in the set of potential expert users.

Figure 5:
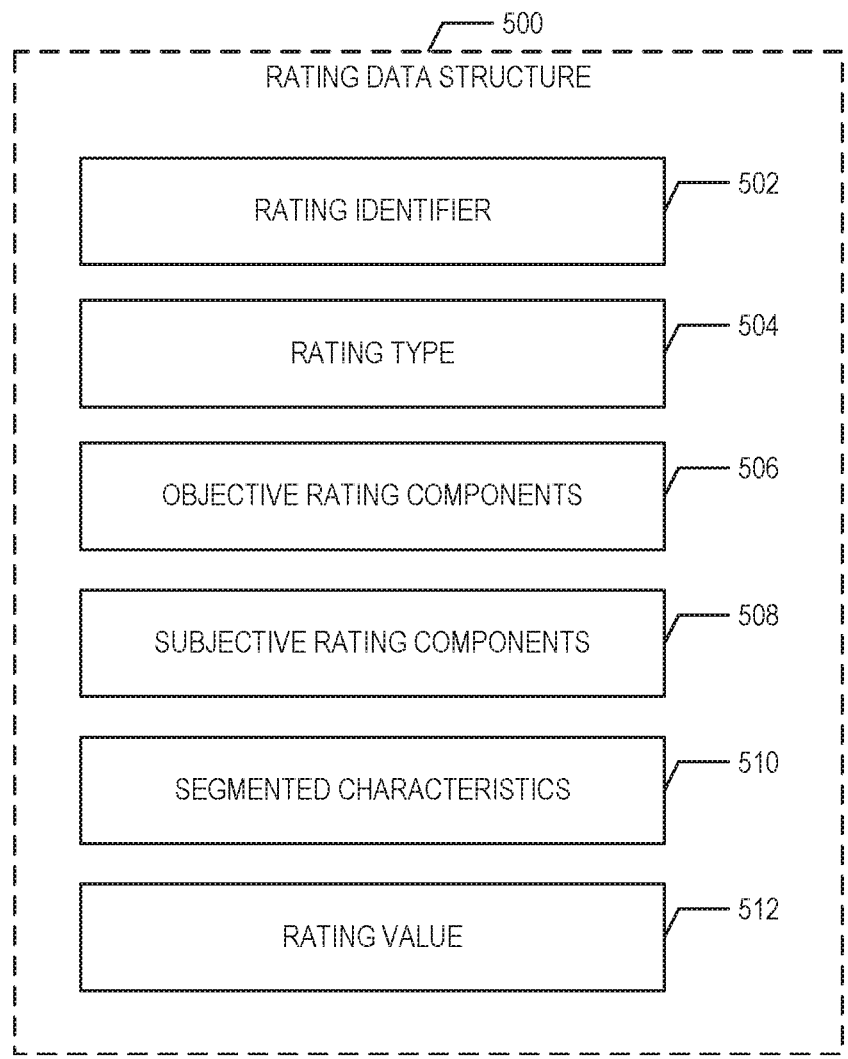
FIG. 5 illustrates a rating data structure, according to various examples.

FIG. 5 illustrates a rating data structure 500, according to various examples. FIG. 5 includes rating identifier 502, rating type 504, objecting rating components 506, subjective rating components 508, segmented characteristics 510, and rating 512.

The underlying structure of rating data structure 500 may conform to a standardized format. For example, an XML Schema Definition (XSD) file may be used to indicate the various illustrated portions of rating data structure 500 as described above. When a new rating data structure is created, the rating data structure may be stored as an XML document conforming to the XSD file. Other file formats may be used without departing from the scope of this disclosure.

Rating data structure 500 is illustrated as a generic rating data structure that may be used for multiple types of ratings. More specific rating data structures may also be used. For example, there be separate application proficiency and content editor rating data structures. In such cases, rating type 504 may not be needed.

Rating data structures may be managed-created, deleted, updated, etc.—using a rating management UI. The rating management UI may be served as a web interface or standalone application, in various examples. The rating management UI may be hosted within or be communicatively coupled to user matching system 102. Access to the rating management UI may be managed according to authorized personnel. The rating management UI may present a set of input UI elements to define a rating data structure. In some examples, the UI inputs correspond to fields in rating data structure 50X).

Rating identifier 502 may indicate the name of the rating. The name be a function of rating type 504. For example, rating types may be for application feature proficiencies, overall application proficiency, document intent experience, ratings from other users, time to complete a task, among others. Accordingly, rating identifier 502 may be "pivot tables" and rating type 504 may be "feature proficiency."

Ratings may be objective in that the measurement originates from a trusted third-party or is quantitative in nature. In contrast, subjective rating components 508 may originate from other users and be qualitative in nature. If the rating originates from a user—even if the rating is a number—as opposed to measured application data, etc., the rating may be considered subjective.

Objective rating components 506 may include measurements of data related to the type of rating. For example, if rating type 504 is for application feature proficiencies, objective rating components 506 may include the number of times a feature has been used, the frequency the feature has been used, certification from third parties related to the feature, job history, education level, obtained degrees, closeness to meeting an estimated budget, among other things.

Subjective rating components 508 may include ratings given by human users related to the type of rating. For example, there may be a quality rating of an application support page attributable to a user. In such an instance, rating identifier 502 may include the name of the support page or a name of feature of an application that the support page is for. Another subjective rating may be an overall rating for an expert user with respect to how helpful the expert user was in assisting an end user. For example, after completing a document, the end user may be given the opportunity to rate how helpful the expert user was (e.g., a 1-5 rating). Similarly, the expert user may give a rating to the end user.

Segmented characteristics 510 may be used for more granular ratings. A segmented characteristic may be a rating type. For example, a user may have a helpfulness rating for users with high proficiency in application and a different helpfulness rating for users with a low proficiency in the application. As another example, a user may have different helpfulness ratings based on an age of the end user requesting help. Another segment may relate to the cost to complete a document. For example, a particular expert user may be rated highly when being paid above $100 but have a lower rating when being paid less than $100.

Rating value 512 may include a value representing rating identifier 502 for rating type 504 and segmented characteristics 510, if applicable. The value may be quantitative or qualitative in nature. Rating 512 may be calculated based on the values included in objecting rating components 506 and subjective rating components 508 for a particular rating. For example, a weighting formula may be used for the various components such as (0.2)(objective rating 1)+(0.3)(objective rating 2)+(0.5)(subjective rating 1). The formula and weights may be stored with within rating data structure 500 and may editable by an administrator user.

Signal collection 130 may be used to obtain data for objecting rating components 506 and subjective rating components 508. The signals may come from within user matching system 102 or applications managed by user matching system 102 as well as external sources. External sources may include, but are not limited to, personal or professional social networks, accreditation services, third party data aggregators, etc.

An external source may be accessed using a variety of means. For example, an external source may provide an API that enables the user matching system 102 to specify a user identification. In response to the API call, the external source may format a response data package with data associated with the user identification. The information may include proficiency ratings for applications, application features, profession data such as current job title, and the like. The information may be stored as user characteristics or ratings within a user profile.

In another example, user matching system 102 may access the external source using user provided credentials (e.g., as stored in a user profile data structure) to act as the user. Then, user matching system 102 may use screen scraping techniques, as are known in the art, to retrieve information such as technical proficiency ratings, from the external source.

Data retrieved from an external source may be transformed to a format consistent with an ontology used by user matching system 102. For example, a professional social network may have skills a user can enter into the user's profile. A data map—as stored in user matching system 102—may identify a mapping between the skills of the social network and user characteristics of a user profile data structure. Accordingly, when retrieving data from the social network, the map be queried to obtain the ontology terminology (e.g., a feature rating or application proficiency) for the skill. The mapping may also identify a scale to use (e.g., 50% to a 2 rating).

Figure 6:
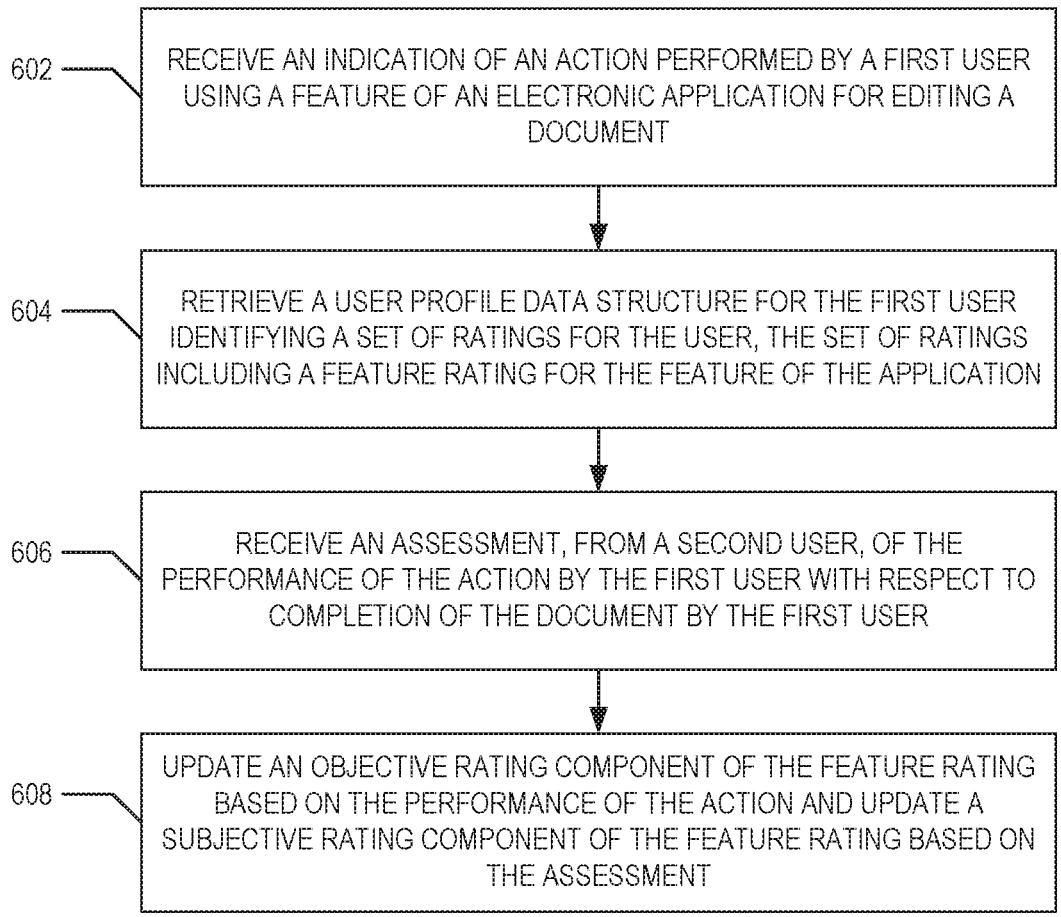
FIG. 6 is a flowchart representation of a method to update a feature rating, according to various examples.

FIG. 6 is a flowchart representation of a method to update a feature rating, according to various examples. The method may be embodied in a set of instructions stored in at least one computer-readable storage device of a computing device (s). A computer-readable storage device excludes transitory signals. In contrast, a signal-bearing medium may include such transitory signals. The computing device(s) may have one or more processors that execute the set of instructions to configure the one or more processors to perform the operations illustrated in FIG. 6. To this end, the one or more processors may instruct other parts of the computing device to carry out the set of instructions. For example, the computing device may instruct a network device to transmit data to another computing device or the computing device may provide data over a display interface to present a user interface. In some examples, performance of the method may be split across multiple computing devices.

At operation 602, in an example, an indication may be received of an action performed by a first user using a feature of an electronic application for editing a document. In an example, the indication is received at or within a system such as user matching system 102.

The indication may include receiving or accessing a log of the activities performed by the first user with respect to the application. For example, the log may be a data store with telemetry data of actions taken by users within applications. The actions may be associated with a user ID, a time the action was taken, an application identifier, etc. Accordingly, the data store may be queried to obtain what activities the user has taken with respect to the feature of the application to receive the indication of the first user using the feature of the application.

The log may also identify actions taken by the first user with respect to the feature that are not direct uses of the feature. For example, a knowledge repository may store content related to features of applications. The first user may have created an object, such as written content, with respect to the feature of the application.

At operation 604, in an example, a user profile data structure may be retrieved for the first user. The user profiled may identify a set of ratings for the user including a feature rating for the feature of the application. The user profile data structure may be defined according to a defined schema. In an example, a database may be queried using a user id of the first user to retrieve the data structure. A feature rating may include subjective and objective components.

At operation 606, in an example, an assessment may be received, from a second user, of the performance of the action by the first user with respect to completion of a document by the first user. For example, the first and second user may have completed a collaborative editing session with respect to the document. Completing the document may have involved the first user using the feature (e.g., creating a pivot table, formatting headers in a presentation document, etc.). A prompt may be presented to the second user, within the application, to assess the first user's performance with respect to the completed document. Reciprocally, the first user may give a rating to the second user. A user profile of the second user may be updated based on the rating.

At operation 608, an objective rating component of the feature rating may be updated based on the performance of the action. For example, the objective rating may be the number of times the first user has used the feature. A subjective rating component of the feature rating may be updated based on the assessment. For example, the rating may be averaged along with other previous assessments. In some instances, a higher weight may be given to recent (e.g., the last ten) performances of the feature.

In various examples, multiple versions of the feature rating are stored for the first user. The multiple versions may be segmented according to user characteristics (e.g., age, education level, application proficiency). For example, user characteristics of the second user may be accessed by retrieving the user profile for the second user. The user characteristics may include an age of the second user. Based on the age, a version of the feature rating from the multiple versions of the feature rating in accordance with the age of the second user may be updated. The ratings may also be segmented based on cost. For example, a user may have a first rating for document completion costs at a first price range and a second rating the document completion costs at a second price range.

The method may additionally include accessing a user identification for the first user with respect to an external source of data such as a third-party data store. The third-party data store may be a social network with application feature proficiency ratings. A rating request may be transmitted to the third-party data store using user identification of the first user. Based on a response message from the third-party store, the first feature rating may be updated. For example, an objective rating of the feature may be updated by averaging the rating with other received signals.

In an example, a rating of written content may be received by a third user. For example, a written content a UI element may include an option to give a helpfulness rating to the written content. The feature rating may be updated based on the rating of the written content by the third user. For example, one of the subjective components of the feature rating may be updated.

In an example, a collaborative editing session may be established with respect to another document, over a network connection, between a third user and the first user based upon the feature rating and availability of the first user. For example, user matching system 102 may track whether or not the first user has been or is working with another user before making a match with the third user. The collaborative editing session may be established based on a match between the first user and third user. A match may be made using a method such as described with respect to FIG. 7.

In some examples, objective rating components for various features of the application used by the first user may be updated based on the established collaborative editing session. For example, the total number of times the first user has used a feature may be updated.

Figure 7:
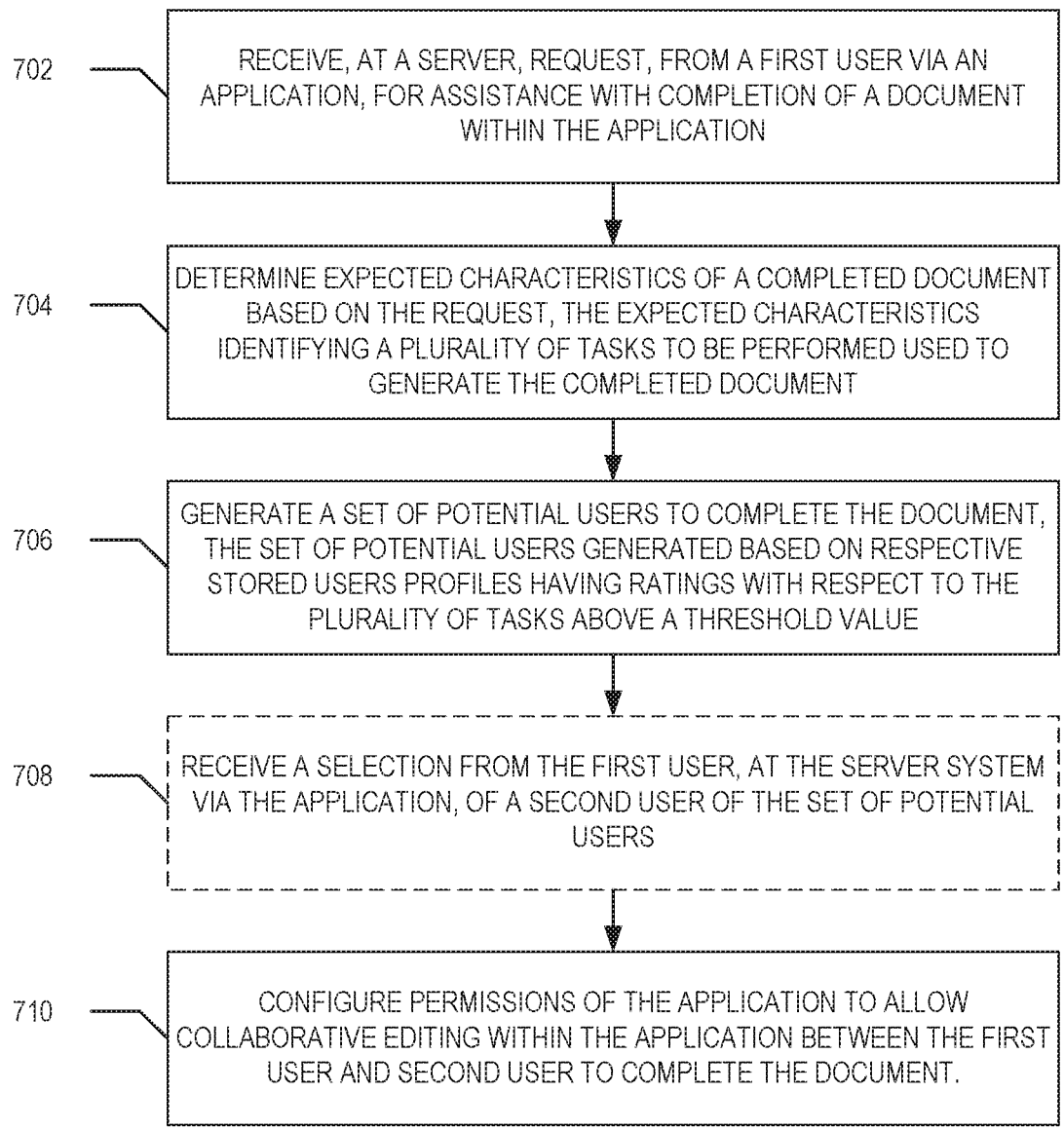
FIG. 7 is a flowchart representation of a method to match a first user with a second user, according to various examples.

FIG. 7 is a flowchart representation of a method to match a first user with a second user, according to various examples. The method may be embodied in a set of instructions stored in at least one computer-readable storage device of a computing device(s). The computing device(s) may have one or more processors that execute the set of instructions to configure the one or more processors to perform the operations illustrated in FIG. 7. A computer-readable storage device excludes transitory signals. In contrast, a signal-bearing medium may include such transitory signals. To this end, the one or more processors may instruct other parts of the computing device to carry out the set of instructions. For example, the computing device may instruct a network device to transmit data to another computing device or the computing device may provide data over a display interface to present a user interface. In some examples, performance of the method may be split across multiple computing devices.

At operation 702, in an example, a request is received from a first user via an application. In an example, the request is received at a server. The request may be for assistance with completion of a document within the application. The server may be user matching system 102. The request may include an identifier of the first user. The identifier may include a domain (e.g., user@company.com where company.com is the domain). The application may be executed locally on a client device of the first user or via webpage on the client device.

At operation 704, in an example, expected characteristics of a completed document are determined based on the request. The determination may be made using component of user matching system 102 such as intent determination component 120. The expected characteristics may identify a plurality of tasks to be performed to generate the completed document. In an example, the characteristics are determined based on data entered by the user in the application in conjunction with the request (e.g., questions 302). The characteristics may also be based on telemetry data of the first user leading up to the request.

The expected characteristics may be based on calculating a probability that the request is for a completed document with a first intent of a plurality of document intents. For example, intent determination component 120 may compare words in the request with descriptions of document intents. Other probability-based scores may be used as described previously. In some examples, a number (e.g., three) of the higher probability document intents are presented to the user to confirm the document intent.

In an example for the chosen or determined document intent, a document intent data structure is retrieved. The document intent may identify the plurality of tasks. The tasks may be features of the application that may be needed to be known to complete the document per the request.

The expected characteristics may include expected content of the completed document and completion preferences for the completed document and wherein generating a set of potential users is further based on the expected content and completion preferences. The expected content may be based on a description of the request entered in response to one of questions 302. The expected content may be used as one of the factors in determining the document intent. Completion preferences may be used as a factor in matching the first user with the second user as discussed further in operation 706.

At operation 706, in an example, a set of potential users to complete the document may be generated. The set of potential users generated may be based on respective stored user profiles having ratings with respect to the plurality of tasks above a threshold value as well as availability of the potential users given an expected time to complete the document. Consider that user matching system 102 iterates or queries a data store of user profiles (e.g., user profiles 114 or database 128) for a set of user profiles. The query may include initial limiting factors to decrease the processing power and energy use needed to search through all of the user profiles. For example, the search may be limited to potential user profiles that have the same domain as the first user. This may be useful so that the first user will end up working with an expert user that is part of the same company or organization as the first user. This has the additional benefit of reducing privacy concerns with sharing information with an outside expert.

Another filter may to only look at user profiles in which a rating data structure exists for each of the plurality of tasks. If a particular user profile does not have a rating data structure then it is unlikely that the particular user profile will be a good match for the first user. To this end, the method of FIG. 7 may include retrieving the stored user profiles for a set of potential users. Then for each respective user profile of the set of potential users: (1) determining that the respective user profile identifies a respective rating data structure for each of the plurality of tasks; and (2) calculating a match score for the respective user profile, with respect to the request from the first user, based on ratings identified in the rating data structures. The match score may be calculated in a variety of manner including but not limited, a weighted average of the ratings and a sum of the ratings.

In some instances, a rating data structure may include segmented ratings based on a user characteristics. For example, a user may have one rating for based on interactions with 20-30 year old males and another for interactions with a 30-40 year old females. Accordingly, user characteristics of the first user may be used to retrieve a rating from the respective rating data structure associated with the user characteristics of the first user. The user characteristics of the first user may be stored in a user profile of the first user.

In some examples, after the match score has been calculated based on the ratings, additional factors may be used to narrow the set of potential users. For example, the completion preferences may be used to remove some users from the set of potential users. Consider that the set of completion preferences includes a due date and an expected cost. The completion preferences may be compared to information in the set of user profiles of the set of potential users. The information may include preferences of the users with respect to cost and timeliness. In some examples, a request may be transmitted from user matching system 102 to computing devices of the potential users to determine the preferences. Based on the profiles and responses, the set of potential users may narrowed to remove users that cannot meet the completion preferences.

In some examples, the set of potential users (narrowed or otherwise) may be presented to the first user. Presenting may include an indication of when each of the potential users may complete the request, the expected cost, and background information (e.g., education, proficiency levels) on each of the potential users. The presentation may be in the same application as the request. The application may permit the first user to select one of the potential users as a second user. At operation 708, the selection may be received at the server of the second user.

At operation 710, in an example, permissions may be configured of the application to allow collaborative editing within the application between the first user and a second user of the set of potential users to complete the document. For example, each document may have an identifier and a list of authorized users stored within user matching system 102. Upon received the selection of the second user, the server may update the list of authorized users for the document within database 128. Then, the second user may be granted access to edit the document at the same time as the first user. In some example, a chat session is initiated between the first and second users facilitated by user matching system 102 using techniques known in the art. In some examples, the users may chat within the application (e.g., use a sidebar interface).

After the document has been completed the first and second users may rate the other. In the case of the second user, a rating data structure within the user profile of the second user with a task of the plurality of tasks may be updated based on a received rating from the first user. For example, if the second user had to generate a pivot table and a chart, the ratings for the pivot table and chart generation may be updated (e.g., averaged with existing ratings). In some examples, the rating may only be updated with respect to the application.

A rating for the first user may updated based on a rating from the second user. This rating may reflect the promptness in paying by the first user, the clarity of the request, or other factors. The rating may be used by expert users to decide if he or she wants to work with the first user.

Establishing a pool of expert users (e.g., expert pool 108) may present its own challenges. One possible method to generate the pool is to ask users to self-rate (e.g., on application, skills, etc.). In another example, a system may monitor user application activity. Both of these approaches have potential problems. First, self-rating by the user directly is inherently subjective and non-verified. Second, knowing how often a user has used a feature in an application may not, by itself, indicate the user is an expert for the feature. For example, one feature of an application may generally require performance 100 times before a user may become proficient. However, it may not be known-prior to establishing an expert pool—that it takes 100 performances.

Accordingly, a user may be incorrectly added to an expert pool if self-rating or user activity metrics are used. Then, computing resources (e.g., processing power, memory, etc.,) may be wasted when a potential-expert is selected to work on a task or help an end-user complete a document when the potential-expert is not qualified.

Figure 8:
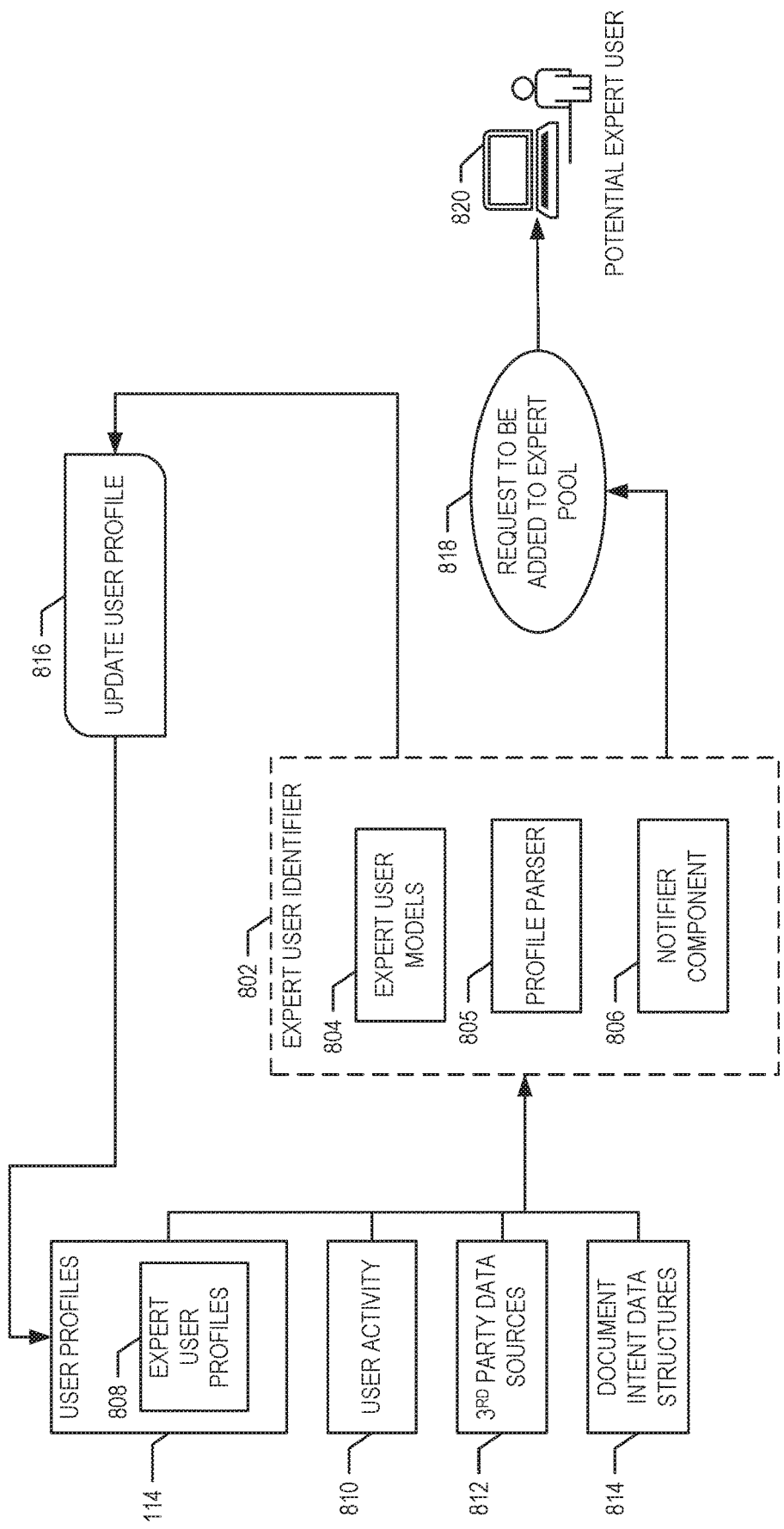
FIG. 8 is schematic diagram illustrating an expert user identifier, according to various examples.

FIG. 8 is schematic diagram illustrating an expert user identifier, according to various examples. FIG. 8 illustrates expert user identifier 802 that includes expert user models 804, profile parser 805, and notifier component 806. FIG. 8 also illustrates user profiles 114, expert user profiles 808, user activity 810, 3rd party data sources 812, document intent data structures 814, update user profile 816, request 818 to be added to an expert pool, and potential expert user 820.

In various examples, expert user identifier 802 is a component of user matching system 102. Expert user identifier 802 may be stored as computer-readable code on a storage device executable on at least one hardware processing unit. Expert user identifier 802 may be periodically (e.g., daily) executed to identify potential experts to be added to expert pool 108. In various examples, users that are part of expert pool 108 are represented as expert user profiles 808 within user profiles 114.

Expert user profiles 808 may be a subset of all users interfacing with user matching system 102. As detailed previously, an individual user may be both an end-user and an expert user. A user may be considered an expert user with respect to some features of application and not others. If a user is an expert for at least one feature, the user may be part of expert pool 108, and thus have a profile in expert user profiles 808.

Expert pool 108 may be initially be manually seeded with expert users using human operators. For example, user profiles 114 may be examined for indicators that an administrator user believes indicate a user is an expert in with respect to application feature(s). Indicators may include job history, education, subjective ratings, data from 3rd party data sources 812, etc. The administrator user(s) may then add the expert to expert pool 108. Over a period of time, initial expert users may be removed from the pool. For example, if an expert user's rating for a feature drops below a threshold-based on feedback from end users—the expert user may be removed from expert pool 108.

Accordingly, after a period of time (e.g., three months), the remaining experts in expert pool 108 may represent a source of truth of certified experts for various features of application. Thus, users that have not been identified as experts in the features may compared to users in expert pool 108 to determine if they should be added to expert pool 108 using expert user identifier 802.

A user may be identified as an expert in the user's profile in a variety of manners. A user profile data structure associated with a user may have one or more rating dating structures—as shown in FIG. 5, for example. In various examples, the expert status, and thus availability in expert pool 108, is made explicit by adding data to the user profile or rating data structure. The user profile data structure schema may include a section to list all feature/applications that the user is considered an expert in using the criteria described above. The rating data structure may also include a Bool data field (or other data element) for the expert status.

Expert user identifier 802 may then use the initially identified experts (e.g., expert user profiles 808), in conjunction with user profiles 114, user activity 810, 3rd party data sources 812, and document intent data structures 814 to find previously unidentified experts. To identify the experts, different expert user models 804 may be used. Model types may include a weight component score, a similarity score, k-nearest neighbor, neural networks, etc. Although the different model types may be used, the models may use the same or overlapping inputs, in various examples.

Finding users to add to expert pool 108 with respect to pivot tables is described as a running scenario below; however, finding experts for other application features may use a similar set of operations. Profile parser 805 may obtain a subset of expert user profiles 808 that have been determined to be experts with respect to pivot tables. For example, profile parser 805 may query database 128 (as shown in FIG. 1) to find user profiles that have a bool value set to True for the pivot table feature.

Expert user identifier 802 may also retrieve user profiles were previously explicitly determined to be experts, but have since been removed. As described, the initial pool of experts may be determined using a manual process, and an administrator may inadvertently label a user as an expert for pivot tables when the user should not have been. The user may be removed as an expert for pivot tables for a variety of reasons, such as if the user's rating for pivot tables falls below a threshold (as indicated in a ratings data structure), the user explicitly indicates they are not an expert through a user interface, etc. At this point, an indication may be made in the user profile that the user is not an expert for pivot tables.

Accordingly, using the above methodology, there be an accurate labeled data set of both experts and non-experts for pivot tables. This is contrast to simply gathering all users that are non-experts for pivot tables because not every non-expert will have been labeled as a non-expert. The default state for a user may be to have no label one way of the other with respect to an expert status.

Profile parser 805 may retrieve user characteristics from the subset of expert user profiles 808 associated with experts for pivot tables. The user characteristics may include any data stored in the user profile data structure for the users including, rating education, jobs, user activity (telemetry data), etc. In some examples, profile parser 805 accesses 3rd party data sources 812 to update the user profiles with the latest available information before retrieving the users' characteristics. Accessing 3rd party data sources 812 may be completed in a similar manner as discussed with respect to external sources of data in FIG. 1.

The user activity may be further parsed to look for uses of pivot tables in an application(s). A use may be considered a performance of a feature in some examples. Uses may further be broken down to a lower level of granularity. For example, creating a pivot table may be a higher level of category than creating a pivot table with filters and slicers, which may considered be a lower level category. Thus, if warranted, a user may be considered an expert with respect to some lower level categories and not others.

Data retrieved by profile parser 805 may be stored in a database as expert user characteristic data for pivot tables. The data may be organized in a variety of manners. For example, averages, medians, minimums, maximums, modes, and frequency of use (e.g., per day) across multiple expert user profiles 808 for pivot tables may be stored. Accordingly, various statistical techniques (e.g., regression analysis) may be employed to determine what user characteristics are highly correlated (e.g., r>0.75) with an expert status for pivot tables. Other statistics may also be determined such as the minimum number of times an expert user uses pivot tables or the most common educational degree/technical certificate expert users of pivot tables have. The stored data may be considered a modeled expert user with respect to a feature.

In various examples, the statistical analysis of the retrieved data may be performed for different levels of proficiency for pivot tables. For example, users that are in the top third for proficiency (e.g., based on end-user feedback) may be analyzed as one group. Similarly, the bottom third and middle third may be analyzed as their own groups. Thus, when expert user models 804 are applied, a potential user may be given an initial proficiency rating based on which third the potential expert user shares the most similarity with, as discussed below.

After profile parser 805 has retrieved the data from expert user profiles 808, one or more expert user models 804 may be applied to find potential previously unidentified expert users. In various examples, expert user models 804 are applied periodically (e.g., every week) to the larger corpus of user profiles 114. In various examples, expert user models 804 are applied to a subset or individual user profile in response to a trigger event. A trigger event may be performance of a feature (e.g., creating a pivot table).

Applying a similarity model of expert user models 804 may include calculating a similarity score between a potential expert user and the modeled expert user for pivot tables (or other features as applicable). A similarity score may be calculated in a number of manners. For example, calculating the similarity score may include comparing the number of times the potential expert user has used pivot tables with the average number of times the modeled expert user has used pivot tables. Consider that the average number of times is 45 and the potential user has used pivot tables 38 times. The similarity score may be calculated as 38/45. In various examples, unless the similarity score is above a threshold (e.g., 80%), the potential expert user is not considered an expert.

More sophisticated similarity scores may be made, such as by comparing the number of times the potential expert user has used pivot tables with the distribution of times the expert users have used pivot tables. If the potential user is at least within a standard deviation of the center, the potential expert user may be considered an expert.

A similarity score may involve more than one component. The components may be weighted according to the components strength of correlation between the characteristic and being an expert for a feature. For example, consider that the number of uses has 30% correlation (e.g., r=0.3) and the frequency of use is 60%. Then, a similarity score may be computed using a formula such as: (0.3)(potential expert user use score)+(0.6)(potential expert frequency score). The similarity score formulas may be stored as part of expert user models 804 and may differ between application features.

As another way to determine a similarity score, in various examples, a neural network is used to determine whether a potential expert user is in actuality an expert user. The neural network may be trained using the labeled expert and non-experts for a feature gathered by profile parser 805 with respect to pivot tables. The inputs to the neural network may be all or a subset of user characteristic including user activity data. The outputs may be two nodes-expert or non-expert. Using a neural network may alleviate the need to limit what user characteristics are used for calculating a similarity score. This is because a neural network inherently-through training with a labeled data set—adjusts weights of each of the input nodes (e.g., the number of times a user uses a feature, the frequency, etc.) in proportion with their importance to determining whether or not a user is an expert.

User characteristics of a potential expert user (e.g., potential expert user 820) may be input into the trained neural network. The output nodes of the neural network may indicate a probability potential expert user 820 is an expert with respect to pivot tables. If the probability that potential expert user 820 is above a threshold (e.g., 70%) the user may be considered an expert for pivot tables.

Regardless of the model used to determine new expert users, a notification may still be transmitted to confirm the new expert user wishes to be added to expert pool 108. For example, even if a user may be an expert, the user may not want to assist other users. Accordingly, notifier component 806 may transmit request 818 to determine if potential expert user 820 wishes to be part of expert pool 108. The request may be made within the application the feature has most recently been used in by potential expert user 820. For example, the next time potential expert user 820 creates a pivot table in a spreadsheet application, a pop-up notification may appear to the potential expert user 820. In various examples, a push notification may be transmitted to a device of potential expert user 820. If potential expert user 820 responds affirmatively, expert user identifier 802 may update user profile 816 to indicate potential expert user 820 is an expert for pivot tables.

Once it is known that a user is an expert with respect to one or more features, the user may also be considered an expert for different document intents. As described in detail above with respect to FIG. 4, different document intents are associated with different application features. Accordingly, if expert user identifier 802 determines that potential expert user 820 is an expert with respect to all application features for a document intent, potential expert user 820 may be marked as an expert for the document intent.

For example, expert user identifier 802 may periodically, or in response to a trigger event, iterate through expert user profiles 808. For a respective user profile, expert user identifier 802 may compare all the features the user profile is marked as an expert in with the identified features in each document intent of document intent data structures 814. Document intent data structures 814 may be the same as the document intents as described in FIG. 4, in various examples. When the respective user profile indicates the user is an expert for each the application features for a given intent, the respective user profile may be updated to indicate the expert status for the given intent. In some examples, an additional notification is transmitted to the user requesting permission to indicate the user is an expert with respect to given intent.

Figure 9:
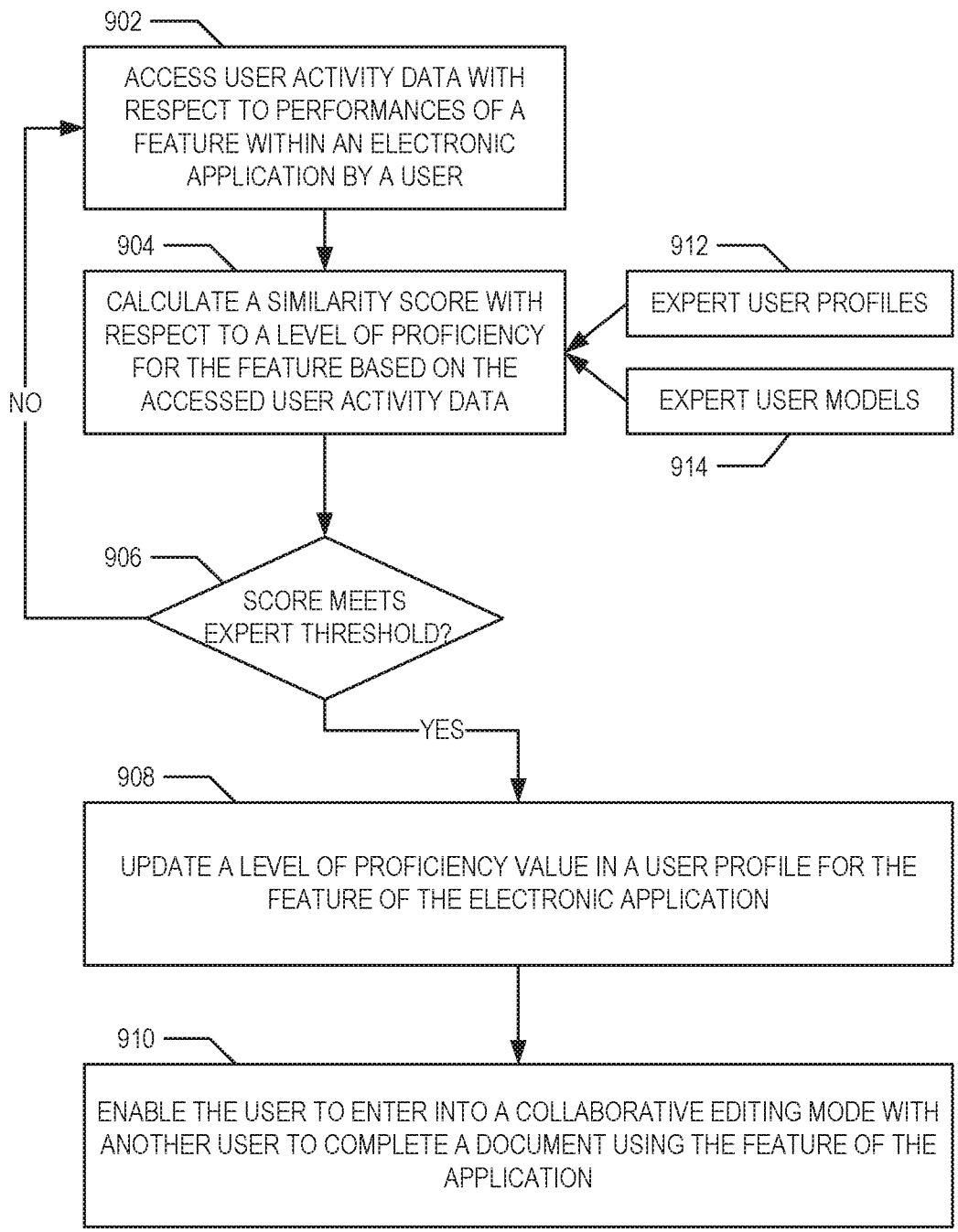
FIG. 9 is a flowchart representation of a method to identify an expert user, according to various examples.

FIG. 9 is a flowchart representation of a method to identify an expert user, according to various examples. The method may be embodied in a set of instructions stored in at least one computer-readable storage device of a computing device(s). The computing device(s) may have one or more processors that execute the set of instructions to configure the one or more processors to perform the operations illustrated in FIG. 9. The computing device(s) may include the components in, and operate as described, in FIG. 8 in order to perform the operations of FIG. 9. A computer-readable storage device excludes transitory signals. In contrast, a signal-bearing medium may include such transitory signals. To this end, the one or more processors may instruct other parts of the computing device to carry out the set of instructions. For example, the computing device may instruct a network device to transmit data to another computing device or the computing device may provide data over a display interface to present a user interface. In some examples, performance of the method may be split across multiple computing devices.

At operation 902, in various examples, user activity data may be accessed with respect to performances of a feature within an electronic application by a user. The user activity data may have been captured within the electronic application as associated with the user. For example, a log of what features of the application the user selected may be stored in a database (e.g., database 128). A feature may correlate to creation of an object in the application such as a pivot table, a chart, an animation, etc.

At operation 904, in various examples, a similarity score for the user is calculated with respect to a level of proficiency for the feature based on the accessed user activity data. Different users may have different levels of proficiencies for the features that may be reflected in the users' respective user profiles. For example, a user may be an expert or novice for a feature. In an example, expert user profiles 912 are retrieved at operation 904. Expert user profiles 912 may be user profiles that have been flagged as having an expert level of proficiency for the feature used by the user at operation 902.

The similarity score may be calculated in a number of manners, which are reflected as expert user models 914. The models may identify a formula for calculating the similar score in some examples. In other examples, the models include a trained machine learning model. Using the retrieved model, a similarity score may be calculated. For example, a quantity of performances of the feature by the user may be to an average quantity of performances of the feature by users in the retrieved set of user profiles. If a machine learning model is used the accessed user activity data may be used as input to the trained machine learning model. The output of the machine learning model may indicate the probability the user is an expert for the feature.

The expert user models may use additional inputs in various examples. For example, the similarity score may further be calculated based on user characteristics of the user. The characteristics may include the type of education degree. Accordingly, consider that 80% of the expert user profiles include a computer science degree. If the user has a computer science degree the similarity score may be increased. If the user does not have a computer science degree, the similarity score may stay the same.

In various examples, the user characteristics include a rating for the feature from an external data source. A social network may calculate a proficiency score for the feature with respect to the user. The average proficiency score for the feature, according to the social network, may be compared to the user's proficiency score according to the social network as a factor in calculating the similarity score (e.g., a weighted component of a series of components).

At decision point 906 the similarity score is compared to a threshold value (e.g., 75%). If the similarity score is below the threshold, flow may continue back to operation 902.

If the similarity score meets or exceeds the threshold operations 908 and 910 may be performed. For example, a level of proficiency value may be updated in a user profile for the feature of the electronic application. The level of proficiency may be an expert level of proficiency. Updating may include adding a data entry to the user profile as described above.

In various examples, an authorization request is transmitted to a device associated with the user prior to enabling operation 910. The device may be registered by the user and stored as part of the user profile. In an example, the device is a device that executes the application and the request appears within the application. The request may identify the feature and indicate that the user has been identified as an expert. The request may further specify that by responding affirmatively to the request, user matching system 102 may match the user with an end-user for help performing the feature.

In response to receiving an affirmative response from the device, the user may be enabled to enter into a collaborative editing mode with another user to complete a document using the feature of the application. Enabling may include adding the user to an expert pool (e.g., expert pool 108).

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 10:
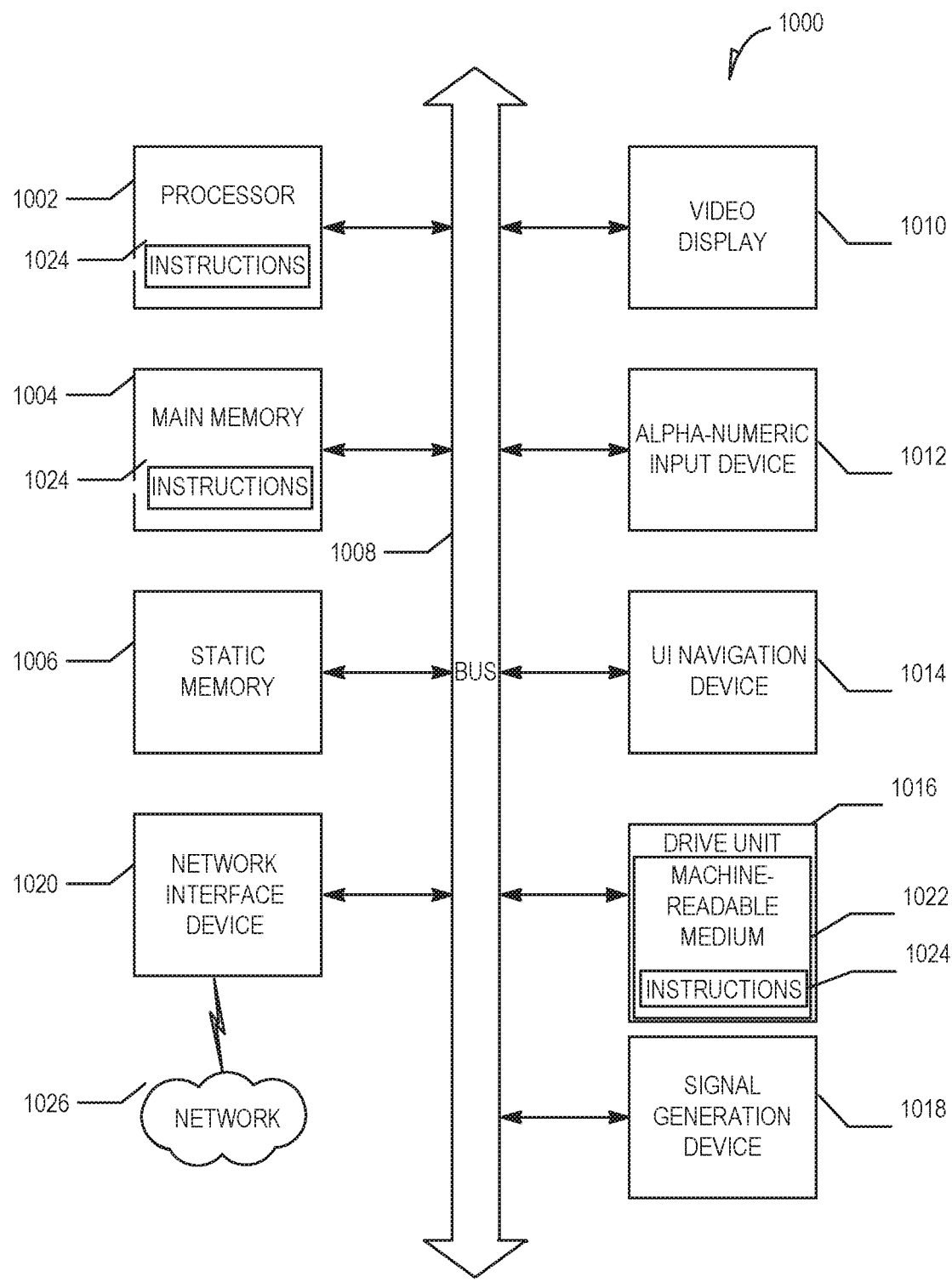
FIG. 10 is a block diagram illustrating an example machine upon which any one or more of the techniques (e.g., methodologies) discussed herein may be performed, according to an example embodiment.

FIG. 10 is a block diagram illustrating a machine in the example form of a computer system 1000, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 1000 may further include a video display unit 1010, an alphanumeric input device 1012 (e.g., a keyboard), and a user interface (UI) navigation device 1014 (e.g., a mouse). In one embodiment, the video display unit 1010, input device 1012 and UI navigation device 1014 are incorporated into a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or another sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   receive an indication that a first user has requested help for completing a task for a document within an application;
   identifying an application feature associated with completing the task within the application;
   accessing user activity data with respect to completing the task using the application feature within the application by a potential expert user;
   calculating a similarity score for the potential expert user with respect to a level of proficiency for the feature based on the accessed user activity data; and
   based on the similarity score meeting a threshold value, establishing a networked communication session between the first user and the potential expert user, enabling the potential expert user to enter into a collaborative editing mode with the first user and allows the potential expert to edit the document using the application feature associated with completing the task within the application of the first user.
2. The method of claim 1, wherein the accessed user activity data is captured within the electronic application.
3. The method of claim 1, further comprising:
   transmitting an authorization request to a device associated with the user prior to the enabling; and
   before the enabling, receiving a response from the device authorizing the enabling.
4. The method of claim 1, wherein calculating a similarity score with respect to a level of proficiency includes:
   retrieving a set of user profiles that have been flagged as having an expert level of proficiency for the feature; and
   comparing a quantity of performances of the feature by the user to an average quantity of performances of the feature by users in the set of user profiles.
5. The method of claim 1, wherein calculating a similarity score with respect to a level of proficiency includes:
   inputting the accessed user activity data into a trained machine learning model, the machine learning model trained based on user profiles that have been flagged as having an expert level of proficiency for the feature; and
   receiving the similarity score based on the output of the trained machine learning model.
6. The method of claim 1, wherein the similarity score is further calculated based on user characteristics of the user.
7. The method of claim 1, wherein the user characteristics include a rating for the feature from an external data source.
8. A storage device comprising instructions, which when executed by at least one processor, configure the at least one processor to perform operations comprising:
   receive an indication that a first user has requested help for completing a task for a document within an application;
   identifying an application feature associated with completing the task within the application;
   accessing user activity data with respect to completing the task using the application feature within the application by a potential expert user;
   calculating a similarity score for the potential expert user with respect to a level of proficiency for the feature based on the accessed user activity data; and
   based on the similarity score meeting a threshold value, establishing a networked communication session between the first user and the potential expert user, enabling the potential expert user to enter into a collaborative editing mode with the first user and allows the potential expert to edit the document using the application feature associated with completing the task within the application of the first user.
9. The storage device of claim 8, wherein the accessed user activity data is captured within the electronic application.
10. The storage device of claim 8, the operations further comprising:
    transmitting an authorization request to a device associated with the user prior to the enabling; and
    before the enabling, receiving a response from the device authorizing the enabling.
11. The storage device of claim 8, wherein calculating a similarity score with respect to a level of proficiency includes:
    retrieving a set of user profiles that have been flagged as having an expert level of proficiency for the feature; and
    comparing a quantity of performances of the feature by the user to an average quantity of performances of the feature by users in the set of user profiles.

12. The storage device of claim 8, wherein calculating a similarity score with respect to a level of proficiency includes:
  inputting the accessed user activity data into a trained machine learning model, the machine learning model trained based on user profiles that have been flagged as having an expert level of proficiency for the feature; and
  receiving the similarity score based on the output of the trained machine learning model.

13. The storage device of claim 8, wherein the similarity score is further calculated based on user characteristics of the user.

14. The storage device of claim 8, wherein the user characteristics include a rating for the feature from an external data source.

15. A system comprising:
  at least one processor;
  a storage device comprising instructions, which when executed by the at least one processor, configure the at least one processor to perform operations comprising:
  receive an indication that a first user has requested help for completing a task for a document within an application;
  identifying an application feature associated with completing the task within the application;
  accessing user activity data with respect to completing the task using the application feature within the application by a potential expert user;
  calculating a similarity score for the potential expert user with respect to a level of proficiency for the feature based on the accessed user activity data; and
  based on the similarity score meeting a threshold value, establishing a networked communication session between the first user and the potential expert user, enabling the potential expert user to enter into a collaborative editing mode with the first user and allows the potential expert to edit the document using the application feature associated with completing the task within the application of the first user.

16. The system of claim 15, wherein the accessed user activity data is captured within the electronic application.

17. The system of claim 15, the operations further comprising:
  transmitting an authorization request to a device associated with the user prior to the enabling; and
  before the enabling, receiving a response from the device authorizing the enabling.

18. The system of claim 15, where calculating a similarity score with respect to a level of proficiency includes:
  retrieving a set of user profiles that have been flagged as having an expert level of proficiency for the feature;
  comparing a quantity of performances of the feature by the user to an average quantity of performances of the feature by users in the set of user profiles.

19. The system of claim 15, where calculating a similarity score with respect to a level of proficiency includes:
  inputting the accessed user activity data into a trained machine learning model, the machine learning model trained based on user profiles that have been flagged as having an expert level of proficiency for the feature; and
  receiving the similarity score based on the output of the trained machine learning model.

20. The system of claim 15, wherein the similarity score is further calculated based on user characteristics of the user.

* * * * *